United States Patent [19]

Masuoka

[11] Patent Number: 5,144,653
[45] Date of Patent: Sep. 1, 1992

[54] TELEPHONE SYSTEM CAPABLE OF AUTOMATICALLY DISTRIBUTING TERMINATING CALLS AND METHOD OF PERFORMING COMMUNICATION WITHIN THE TELEPHONE SYSTEM

[75] Inventor: Norio Masuoka, Hino, Japan

[73] Assignee: Kabushiki Kaisha Toshiba, Kawasaki, Japan

[21] Appl. No.: 672,127

[22] Filed: Mar. 19, 1991

[30] Foreign Application Priority Data

Mar. 20, 1990 [JP]  Japan .................................. 2-70566

[51] Int. Cl.⁵ ............................................. H04Q 3/64
[52] U.S. Cl. .................................... 379/113; 379/165; 379/265; 379/266; 379/309
[58] Field of Search ............... 379/165, 113, 133, 140, 379/265, 266, 267, 308, 309, 268, 269

[56] References Cited

U.S. PATENT DOCUMENTS 4,400,587  8/1983  Taylor et al. ....................... 379/266

Primary Examiner—Stafford D. Schreyer
Attorney, Agent, or Firm—Finnegan, Henderson, Farabow, Garrett and Dunner

[57] ABSTRACT

A telephone system including a switching circuit (3) connected to a plurality of extension telephone sets (1-1 to 1-n, 1-p) a plurality of office lines (4-1 to 4-m) for selectively connecting the respective extension telephone sets and the respective office lines, a control unit (6) for connecting an extension telephone set and an office line through the switching circuit (3), a main memory (8) for registering the extension telephone sets diverted into respective terminating call dedicated telephone sets. When a key provided at an extension telephone set is pressed in a predetermined process to input a data for diverting the extension telephone set into a terminating call dedicated telephone set, the control unit (6) registers the extension telephone set into main memory (8). When there is a terminating call for an extension telephone set group consisting of extension terminals dedicated to terminating calls, the control unit (6) distributes the terminating call to the respective extension telephone sets on the basis of the registered contents of main memory (8).

7 Claims, 9 Drawing Sheets

31 ID NO. REGISTERING TABLE

| | |
|---|---|
| 0 | 2 0 0 1 |
| 1 | F F F E |
| 2 | 2 0 0 3 |
| 3 | F F F F |
| ⋮ | ⋮ |
| CTEANL | F F F F |

CORRESPONDING TO TERMINATING CALL LINE

FIG. 3

41 TERMINATING CALL LINE REGISTERING TABLE

| | |
|---|---|
| 0 | F F F F |
| 1 | 0 2 0 3 |
| 2 | F F F F |
| ⋮ | ⋮ |
| CTESDN | F F F F |

CORRESPONDING TO EXTENSION LINE

FIG. 4

51 ID NO. REGISTERING TABLE CORRESPONDING TO EXTENSION TELEPHONE SET

| | | | |
|---|---|---|---|
| 0 | 2 0 0 0 | | 0 0 |
| 1 | 2 0 0 1 | | 0 0 |
| 2 | 2 0 0 2 | | 0 1 |
| 3 | 2 0 0 3 | | 0 1 |
| 4 | F F F F | | F F |
| ⋮ | ⋮ | | ⋮ |
| CTEAID | F F F F | | F F |

51-1 ID NO. RETRIEVING TABLE
51-2 PILOT NO. RETRIEVING TABLE

FIG. 5

61 LOGICAL NO. REGISTERING TABLE CORRESPONDING TO EXTENSION TELEPHONE GROUP

CORRESPONDING TO TERMINATING CALL LINE

| | | | |
|---|---|---|---|
| 0 | 0 2 0 0 | | 0 0 |
| 1 | 0 2 0 1 | | 0 1 |
| 2 | 0 2 0 2 | | 0 1 |
| 3 | F F F F | | F F |
| ⋮ | ⋮ | | ⋮ |
| CTEANL | F F F F | | F F |

61-1 LOGICAL NO. RETRIEVING TABLE
61-2 PILOT NUMBER RETRIEVING TABLE

FIG. 6

TELEPHONE SYSTEM CAPABLE OF AUTOMATICALLY DISTRIBUTING TERMINATING CALLS AND METHOD OF PERFORMING COMMUNICATION WITHIN THE TELEPHONE SYSTEM

BACKGROUND OF THE INVENTION

1. Field of the Invention

The present invention relates to a telephone system which includes a plurality of extension telephone sets dedicated to handling terminating calls and is capable of automatic distribution of terminating calls to the respective extension telephone sets such that each extension telephone set handles substantially equal quantities of terminating calls and to a method of performing communication within the telephone system.

2. Description of Related Art

The telephone system of this type is, for example, an electronic private branch exchange capable of automatically distributing terminating calls to handle a plurality of extension telephone sets as dedicated terminals for receiving external terminating calls. Thus, the respective extension telephone sets dedicated to handling terminating calls can perform dedicated procedures for receiving, for example, reservations of airplane tickets, etc.

The dedicated extension telephone sets are handled as a group and terminating calls to the extension telephone set group are equally distributed to each telephone set. When none of the extension telephone sets is idle in the presence of terminating calls, a queue of terminating calls is formed, and the first terminating call of the queue is transferred to an extension telephone set as soon as the same becomes idle.

A management terminal is provided for managing the extension telephone set group to monitor the situation of the group, creating management data, etc.

The management terminal includes an application processor, a display, a keyboard input unit, a printer, etc. The application processor handles data on the function of automatically distributing terminating calls. For example, the application processor receives from a private branch exchange call data concerning terminating calls for the extension telephone set group, stores and compiles the call data. The processor responds to data inputted from the keyboard input unit by a supervisor (an operator which operates the management terminal) to calculate the number of terminating calls handled by a predetermined agent (an operator which operates an extension telephone set), the time required for telephonic communications, etc., and outputs the results on the printer and/or display. If a plurality of extension telephone set groups are beforehand set, the application processor can calculate the number of terminating calls and the time required for telephonic communication for each extension telephone set group and output the results on a printer or a display. It can also calculate the number of terminating calls and the time required for telephonic communications for each extension telephone set and output the result on the printer or the display.

In the terminating call automatic distributing function, the call data concerning the terminating call is compiled and managed for each agent, each extension telephone set group and each extension telephone set. Therefore, it is necessary to identify each agent, each extension telephone set group and each extension telephone set. To this end, an ID number is allocated to each agent, a pilot number is allocated to each extension telephone set group, and a logical number is allocated to each communication line which is dedicated to terminating calls and is led to the respective extension telephone sets of each group, thereby to enable identification of each agent, each extension telephone set group and each extension telephone set.

In performing terminating call processing procedures, an agent must first perform a log-in operation on an extension telephone set in the group to which the agent belongs and then declare the start of the procedure. The log-in operation includes pressing a log key provided at the telephone set and then dialing the agent's ID number. By these operations, the fact that the terminating call dedicated line of the extension telephone set corresponds to the ID number and that a terminating call can be handled by using the terminating call dedicated line is reported to the control system of the private branch exchange and to the application processor. There is an inverse operation called a log-out operation which includes disconnecting a terminating call dedicated line from the ID number and reporting the termination of the procedures to the control system of the private branch exchange and to the application processor.

When an agent performs a log-in operation on the terminating call dedicated line of the extension telephone set, a terminating call for the group to which the extension telephone set belongs is transferred to the terminating call dedicated line of the extension telephone set in accordance with a predetermined terminating distributing algorithm. When the extension telephone set responds to the terminating call, call data on the contents of the procedure (response time, talk end time, etc.,) is reported together with the logical number of the terminating call dedicated line and the agents ID number to the application processor and is stored therein for each of the agents, extension telephone groups, and terminating call dedicated lines.

While the same terminating call dedicated line (extension telephone set) can be used by different agents so as to enable shift operation, call data is stored for each of the agents' ID numbers, so that there are no problems in the management of a quantity of work of each agent. However, unless both of the terminating call dedicated line and the agent belong to the same extension telephone group, a log-in operation is impossible. Namely, even if an agent belonging to a predetermined extension telephone set group tries to perform a log-in operation on the terminating call dedicated line of a different extension telephone set group, the log-in operation will become ineffective. This is because call data would go out of control if the same agent is permitted to perform a log-in operation on a plurality of different extension telephone set groups since call data is managed for each of the agents, extension telephone set groups and terminating call dedicated lines.

The supervisor can change the setting of the terminating call dedicated terminal by operating a data setting terminal (for example, teletypewriter) annexed to the private branch exchange. For example, when an extension telephone set group receives a large number of terminating calls, the agent can allocate new extension telephone sets for use as terminating call dedicated telephone sets to the extension telephone set group. When an extension telephone set group receives a small number of terminating calls, the agent can reduce the number of extension telephone sets in the extension telephone set group. Thus, the terminating call processing can be performed appropriately for every group of extension telephone sets. In conventional telephone systems, a problem arises, however, if the number of the terminating calls to be processed in one extension telephone set group temporarily increases rapidly so that the extension telephone sets belonging to that group cannot handle all of these terminating calls. To cope with such situations, it is required to operate a teletypewriter provide at a remotely located private branch exchange. Thus, the conventional telephone systems have a problem in speedy handling of such situations.

SUMMARY OF THE INVENTION

It is an object of the present invention to provide a telephone system capable of increasing/decreasing the number of terminating call dedicated terminals by using an extension terminal on the site to thereby handle the terminating calls rapidly and appropriately, and a method of performing communication within the telephone system.

To achieve the object, the present invention provides a telephone system comprising a switching unit connected to a plurality of extension terminals and a plurality of office lines, for connecting an extension terminal with one of the office lines in response to call origination from the extension terminal and for connecting an office line with one of the extension terminals in response to a terminating call from the office line; an input unit provided for each of the extension terminal, for inputting through the extension terminals a data for diverting the extension terminals into a terminating call dedicated terminals; a terminating call dedicated registering unit for registering an extension terminal which is inputted the data for diverting the extension terminal into a terminating call dedicated terminal; and an automatic terminating call distributing unit for controlling the switching unit so as to distribute terminating calls directed to an extension terminal group consisting of extension terminals which are diverted into terminating call dedicated terminals to the extension terminals on the basis of the registered content of the terminating call dedicated registering unit.

According to the present invention, if a signal indicative of diversion of a desired extension terminal dedicated to the reception of a terminating call is input through input means of a desired extension terminal, the extension terminal is registered in the terminating call dedicated registering means. In this case, the automatic terminating call distributing means is enabled to distribute terminating calls for the extension terminal group to the extension terminals registered in the terminated call dedicated registering means.

BRIEF DESCRIPTION OF THE DRAWINGS

FIG. 3 is a view of an ID number registering table in a main memory in the embodiment of FIG. 1.

FIG. 4 is a view of a terminating call dedicated line registering table in the main memory of the embodiment of FIG. 1.

FIG. 5 is a view of an extension telephone set group vs. ID number registering table in the main memory of embodiment of FIG. 1.

FIG. 6 is a view of an extension telephone set group vs. logical number registering table in the main memory of embodiment of FIG. 1.

DETAILED DESCRIPTION OF THE EMBODIMENTS

One embodiment of the present invention will be described in more detail with reference to the accompanying drawings.

Figure 1:
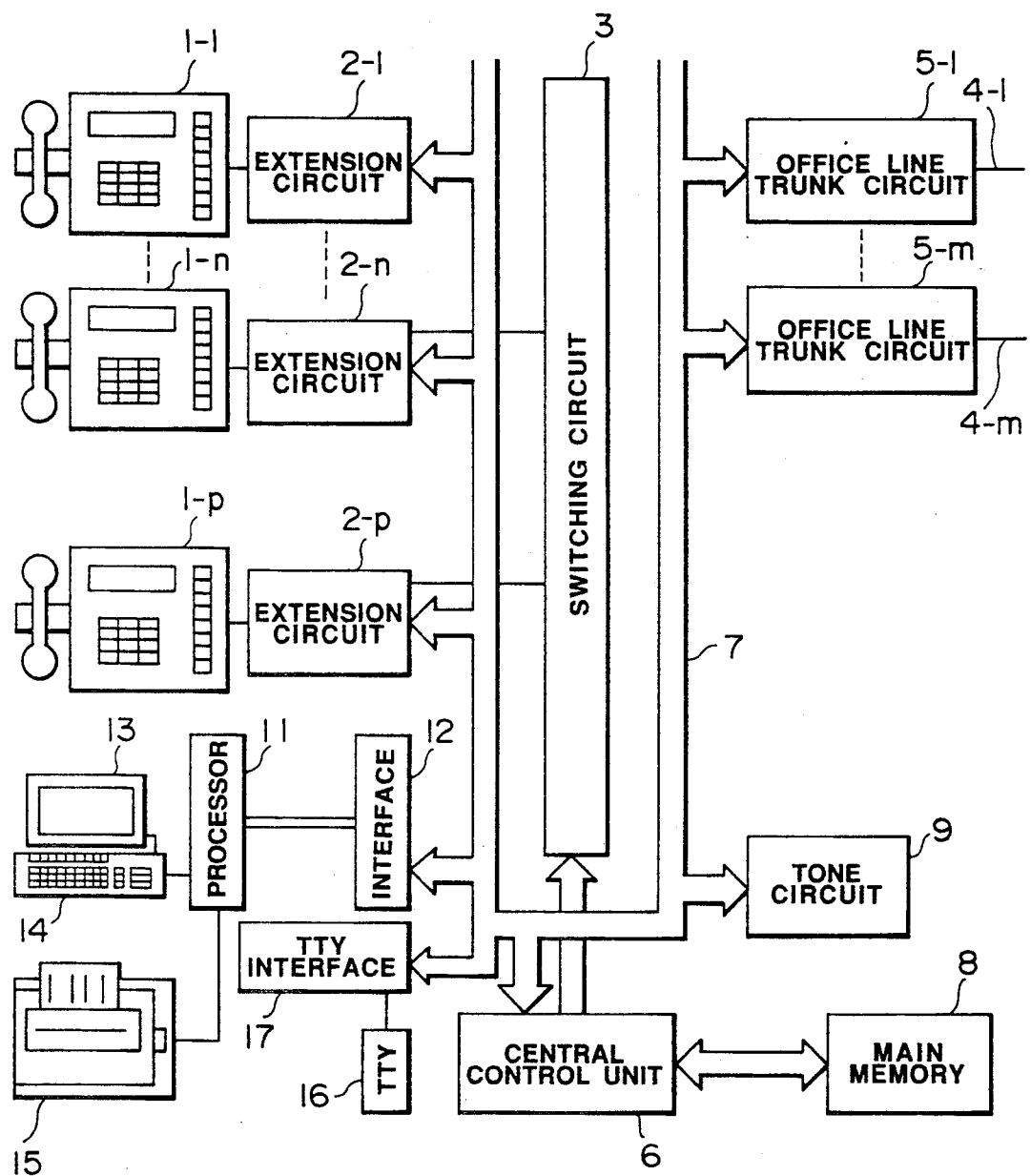
FIG. 1 is a block diagram of an electronic private branch exchange to which an embodiment of a telephone system according to the present invention is applied.

FIG. 1 is a block diagram indicative of an electronic private branch exchange to which one embodiment of a telephone system according to the present invention is applied. In FIG. 1, extension telephone sets 1-1 to 1-n and 1-p are connected to switching circuit 3 through corresponding extension circuits 2-1 to 2-n and 2-p. Central office lines 4-1 to 4-m are connected to switching circuit 3 through corresponding central office line trunk circuits 5-1 to 5-m. Switching circuit 3 connects required extension circuits to each other for communicating purposes and connects an extension circuit to an office line trunk circuit for communicating purposes. Central control unit 6 transmits/receives various data through bus 7 to and from the respective extension circuits and respective office line trunk circuits and controls switching by switching circuit 3 in accordance with a control program in main memory 8. Tone circuit 9 is started up in response to the control of central control unit 6 to send to switching circuit 3 various tone signals such as a busy tone and a dial tone. These tone signals are sent to the office lines from switching circuit 3 through the office line trunk circuits or from switching circuit 3 to an extension telephone set through the corresponding extension circuit. Application processor 11 is connected to bus 7 through interface 12 and has display 13, keyboard input unit 14 and printer 15. Teletypewriter 16 is connected to bus 7 through teletypewriter interface 17. By operating the teletypewriter, the contents of various data tables in main memory 8 are changed through central control unit 6.

Extension telephone sets 1-1 to 1-n belong to any of a plurality of extension telephone set groups while extension telephone set 1-p does not belong to any of the extension telephone set groups.

In the operation of the automatic terminating call distributing function, central control unit 6 forms call data on a terminating call when it transmits/receives data to and from an extension telephone circuit and an office line trunk circuit and sequentially sends call data to application processor 11, which stores and compiles call data and creates call data for each agent, call data for each extension telephone set group and call data for each telephonic communication line or each terminating call dedicated line leading from the corresponding one of the extension telephone sets. Application processor 11 is responsive to an input from keyboard input unit 14 by the supervisor's operation to display on display 13 call data on each agent, call data on each extension telephone set group and call data on each terminating call dedicated line and outputs those data on printer 15.

Figure 2:
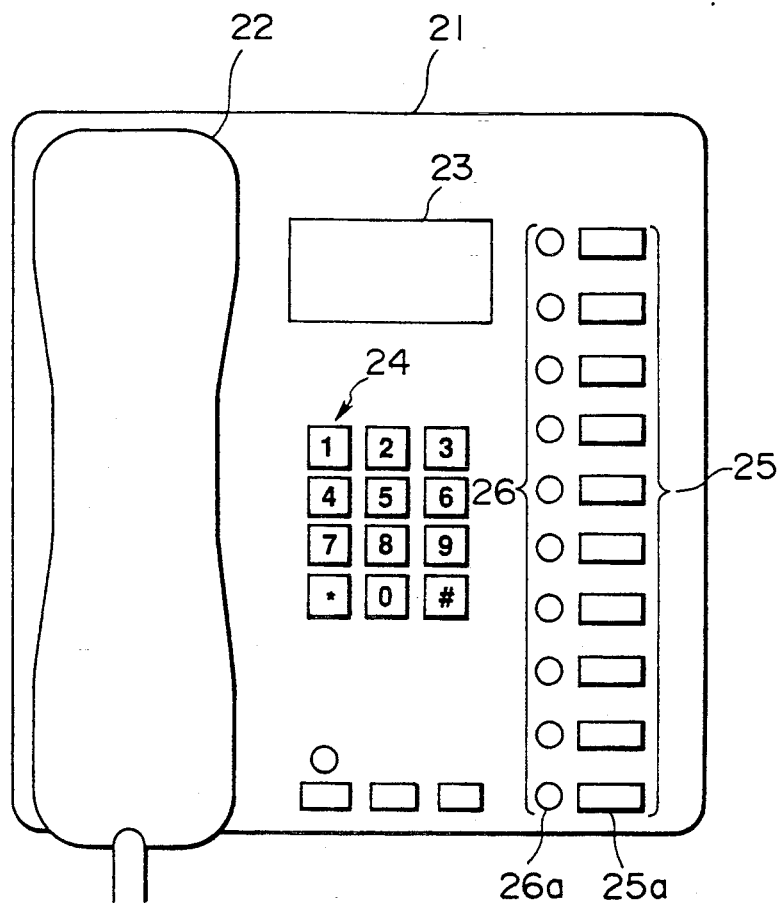
FIG. 2 is a view of the appearance of an extension telephone set in the embodiment of FIG. 1.

FIG. 2 illustrates the appearance of the extension telophone set of FIG. 1, which is a well-known multifunction telephone set. In FIG. 2, handset 22 is placed on housing 21 and the telephone set includes display (for example, a liquid crystal display) 23, dial key 24, a plurality of functional keys 25 and lamps (for example, light emitting diodes) corresponding to those functional keys. In any one of those functional keys 25 is pressed, a lamp corresponding to the functional key is lighted. These functional keys 25 include extension line key 25a which, when pressed, lights lamp 26a.

FIG. 3 shows ID number registering table 31 of various tables in main memory 8 of FIG. 1. Table 31 registers the ID number of an agent who has performed a log-in operation on a terminating call dedicated line. If a value FFFF (hexadecimal digit) is registered on ID number registering table 31, a terminating call dedicated line can newly be set in correspondence to the value FFFF. If a new terminating call dedicated line is set, a value FFFF is registered accordingly in place of value FFFF. If the agent performs a log-in operation on the set terminating call dedicated line, the agent's ID number is registered in place of value FFFF. For example, the numbers "2001" and "2003" are here registered as two agents' ID numbers. Therefore, terminating call dedicated lines equal in number to the registered values FFFF in ID number registering table 31 are newly increased, and value FFFF is registered in place of value FFFF when the terminating call dedicated line is set. If an agent performs a log-in operation on the terminating call dedicated line, the agent's ID number is registered in place of value FFFF.

FIG. 4 shows terminating call dedicated line registering table 41 in main memory 8 shown in FIG. 1. Terminating call dedicated line registering table 41 is constructed such that logical numbers can be registered in correspondence to all the extension lines. The logical number is used to identify the corresponding terminating call dedicated line. When an extension line is diverted to a terminating call dedicated line, a logical number is registered in correspondence to the extension line. The logical number "0203" of one terminating call dedicated line is registered herein. Value FFFF corresponds to an extension line which is not diverted to a terminating call dedicated line. Therefore, by retrieving terminating call dedicated line registering table 41, it will be clarified which extension line is diverted to a terminating call dedicated line and the logical number of the terminating call dedicated line is obtained.

FIG. 5 shows extension telephone set group vs. ID number registering table 51 in memory 8 of FIG. 1. Table 51 includes ID number retrieving table 51-1 where all the agent ID numbers are registered and pilot number retrieving table 51-2 where pilot numbers to identify a like number of extension telephone set groups are registered. The ID numbers on table 51-1 correspond to the respective pilot numbers on table 51-2. Therefore, if the ID number of one agent is retrieved from ID number retrieving table 51-1 and the pilot number corresponding to the ID number is retrieved from table 51-2, it will be clarified tht the agent belongs to the extension telephone set group indicated by the retrieved pilot number.

It is to be noted that the registered contents of table 51 are predetermined. If the registered contents are input by operating teletypewriter 16 to the system, central control unit 6 responds to that action to register the registered contents on table 51 in main memory 8. ID number retrieving table 51-1 has a size predetermined in the system and can register the respective ID numbers corresponding in number to the size. Pilot number retrieving table 51-2 has a size corresponding to ID number retrieving table 51-1 and can register the respective pilot numbers equal in number to the ID numbers. In ID number retrieving table 51-1 and pilot number retrieving table 51-2, values FFFF and FF are registered at the locations where no ID and pilot numbers are registered. If ID and pilot numbers are newly registered, it is checked whether there are any empty areas of the respective ID and pilot number retrieving tables 51-1 and 51-2 or locations where values FFFF and FF are registered. If so, the ID and pilot numbers are registered at those locations.

FIG. 6 shows extension telephone set group vs. logical number registering table 61 in main memory 8 shown in FIG. 1. Table 61 includes logical number retrieving table 61-1 where all the settable terminating call dedicated line logical numbers are registered and pilot number retrieving table 61-2 where the respective extension telephone set group pilot numbers are registered. The logical numbers on table 61-1 correspond to the respective pilot numbers on table 61-2. Therefore, the logical number of a terminating call dedicated line is retrieved from table 61-1 and the corresponding pilot number is retrieved from table 61-2, the terminating call dedicated line belongs to the extension telephone set group dedicated by the retrieved pilot number.

Tables 61-1 and 61-2 each have a size predetermined in the system and can register a predetermined number of logical numbers and pilot numbers thereon. Values FFFF and FF are respectively registered at locations where no logical and pilot numbers are registered, and new logical and pilot numbers are respectively registered at the locations of the values FFFF and FF. The registered contents of extension telephone set group vs. logical number registering table 61 may be updated sequentially in log-in and log-out operations, as will be described later or may be beforehand set by operating teletypewriter 16 like extension telephone set group vs. Id number registering table 51.

Figure 7:
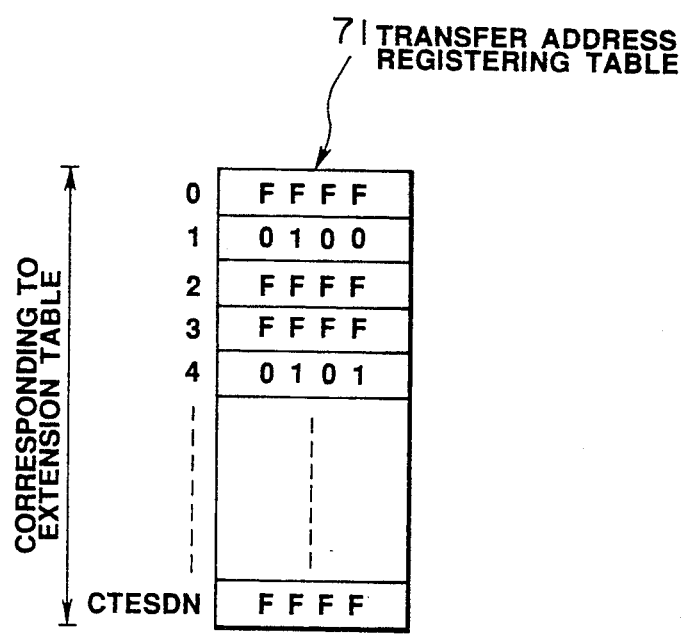
FIG. 7 is a view of a transfer address registering table in the main memory of the embodiment of FIG. 1.
Figure 8:
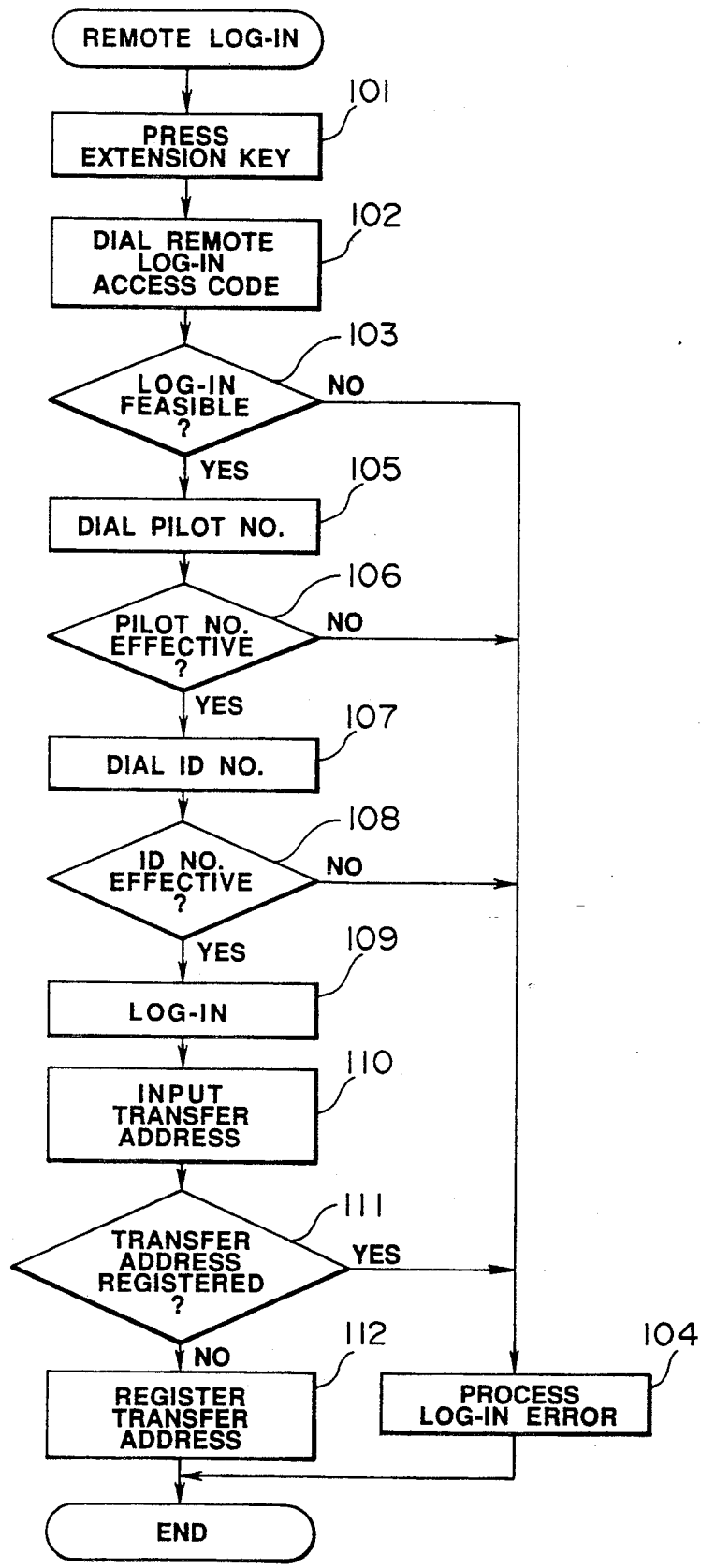
FIG. 8 is a flowchart indicative of diversion of an extension line in the embodiment of FIG. 1 to a terminating call dedicated line.

FIG. 7 shows transfer address registering table 71 in main memory 8 shown in FIG. 1. The table is structured so as to register thereon numbers indicative of the respective transfer addresses corresponding to all the extension lines. A number indicative of a transfer address corresponding to an extension line is the extension telephone number used to call another extension line at the transfer address when a terminating call for the extension telephone set connected to the former extension line is to be transferred. In FIG. 7, the numbers "0100" and "0101" are shown as being registered as the extension telephone numbers at transfer addresses corresponding to two extension lines. The value FFFF shows that no transfer addresses are set in correspondence to the extension lines.

The operation of the system where a log-in operation is performed by a general extension telephone set on an extension line to divert the extension line to a terminating call dedicated line will be described. The agent first presses extension line key 25a (in FIG. 2) of extension telephone set 1-p which does not belong to any of the extension telephone set groups to catch the extension line (step 101), and then dials in a predetermined access code indicative of the log-in operation from the general extension telephone set (step 102). This access code is transmitted from extension circuit 2-b to central control unit 6 through bus 7. Central control unit 6 determines whether the access code is wrong or not and whether log-in is possible or not (step 103). Whether log-in is possible or not is determined by retrieving ID number registering table 31 in main memory 8. Namely, central control unit 6 determines whether ID number registering table 31 has an empty FFFF location where no agent's ID number is registered. If so, it is possible to register a new number there, so that central control unit 6 stores the logical number of a terminating call dedicated line corresponding to that empty location and determines that log-in is possible. If there are no empty locations on table 31, no new numbers can be registered and hence the control unit determines that log-in is impossible.

If control unit 6 determines that the access code is wrong at step 103 or that log-in is impossible, it starts up tone circuit 9 to send an overflow tone to extension telephone set 1-p through bus 7 and extension telephone circuit 2-p and sends an error message indicative of an log-in error through bus 7 and extension telephone circuit 2-p (step 104). Extension telephone set 1-p generates an overflow tone from the ear piece of handset 22 and displays the error message on display 23. Thus, the agent can perceive that log-in is impossible.

If control unit 6 determines that log-in is possible at step 103, the agent inputs a pilot number indicative of the extension telephone set group to which the agent belongs by the dialing operation of extension telephone set 1-p to send the pilot number to central control unit 6 (step 105).

Central control unit 6 determines whether the input pilot number is wrong (step 106).

If the pilot number is wrong, control passes to step 104.

If the pilot number is correct, the agent inputs his ID number by the dialing operation of extension telephone set 1-p (step 107). Central control unit 6 checks the input ID number with the respective ID numbers corresponding to the pilot number on extension telephone set group vs. ID number registering table 51. If the ID numbers coincide, the input ID number belongs to the extension telephone set group corresponding to the pilot number so that central control unit 6 determines that the ID number is not wrong. If there are no coinciding ID numbers, it determines that the input ID number is wrong. In addition, it determines whether the ID number is already registered on ID number registering table 31 in main memory 8 or whether the ID number is already used for the log-in operation of another extension telephone set on the terminating call dedicated line (step 108). If the input ID number is determined as wrong or as already used, control passes to step 104. If the input ID number is determined as not wrong and as not yet used, the log-in operation is performed at step 109 so that the agent's ID number is registered at an empty location in ID number registering memory 31 corresponding to one terminating call dedicated line stored beforehand. The logical number of the terminating call dedicated line is registered at a location corresponding to the terminating call dedicated line on logical number retrieving table 61-1, and the earlier input pilot number is registered at a location corresponding to the terminating call dedicated line on pilot number retrieving table 61-2. The logical number of the terminating call dedicated line is then registered at a position corresponding to the extension line of the extension telephone set 1-p on terminating call dedicated line registering table 41.

Therefore, when the log-in operation is performed by extension telephone set 1-p on the extension line, an access code indicative of the log-in, a pilot number indicative of a desired extension telephone set group, and the agent's ID number are input. If there is an empty terminating call dedicated line belonging to the extension telephone set group at this time, the ID number is registered at a location corresponding to the empty terminating call dedicated line on ID number registering table 31 and the logical number of that new terminating call dedicated line is registered at a location corresponding to the extension line on terminating call dedicated line registering table 41. Thus, the extension line of extension telephone set 1-p is diverted to a terminating call dedicated line.

If the extension number of any extension telephone set at a transfer address from extension telephone set 1-p is dialed in by extension telephone set 1-p (step 110), central control unit 6 confirms whether any extension line number is already registered at a location corresponding to the extension line of extension telephone set 1-p on transfer address registering table 71 (step 111). If so, control passes to step 104. If not, central control unit 6 registers the extension line number indicative of the input transfer address at that location on transfer address registering table 71 (step 112). If the number of the extension line of the transfer address is not input within a predetermined time at step 110, central control unit 6 jumps steps 111, 112 and does not register the transfer address.

The log-out operation to divert the extension line of a general extension telephone set to a terminating call dedicated line is terminated.

Figure 9:
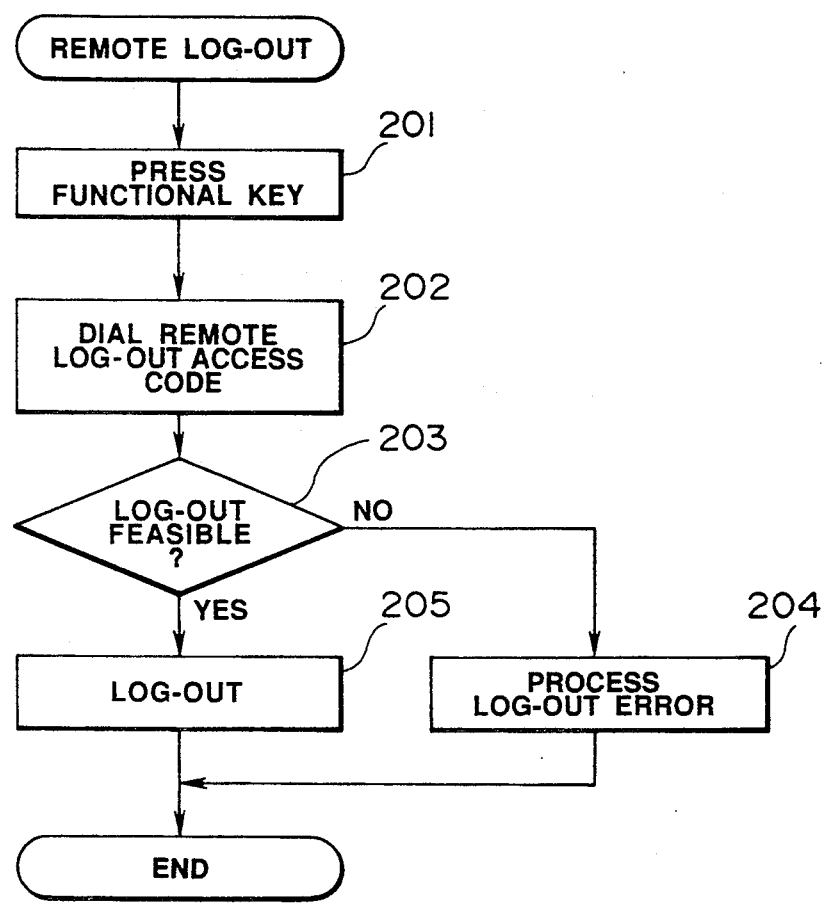
FIG. 9 is a flowchart indicative of the returning of a diverted terminating call dedicated line in the embodiment of FIG. 1 to the original extension line.

The log-out operation of the system which returns the terminating call dedicated line to the original extension line will be described in accordance with a flow-chart of FIG. 9.

First, the agent presses extension line key 25a of extension telephone set 1-p diverted to the terminating call dedicated line key by the log-in operation mentioned above (step 201) and then dials in an access code indicative of the log-out operation (step 202). This access code is delivered to central control unit 6 which determines whether the access code is wrong or not (step 203). If so or if unprocessed terminating calls for the terminating call dedicated line remain even if the access code is not wrong (namely, if a queue of terminating calls is formed), central control unit 6 processes log-out errors at step 204 and reports to the agent that log-out is impossible. Namely, central control unit 6 delivers to extension telephone set 1-p an error message indicative of an overflow tone and a log-out error and hence causes the ear piece of handset 22 to generate an overflow tone and to display the error message on display 23.

If central control unit 6 determines that there are no errors in the access code and that there are no remaining unprocessed terminating calls at step 203, it performs a process for log-out (step 205). Namely, it clears the locations where the agent ID number is registered on ID number registering table 31 in main memory 8, stores value FFFF in the place of the ID number, clears the logical number registered at a location corresponding to the extension line of extension telephone set 1-p on terminating call dedicated line registering table 41, and stores the value FFFF in place of the logical number. Central control unit 6 clears the logical numbers registered on logical number retrieving table 61-1 and instead stores value FFFF on table 61-1, and clears the pilot numbers registered on pilot number retrieving table 61-2 and instead stores value FF on table 61-2. In addition, if any extension number is already registered at a location corresponding to the extension line of extension telephone set 1-p on transfer address registering table 71. Central control unit 6 clears an extension telephone number.

Therefore, in the log-out operation from the diverted terminating call dedicated line, an access code indicative of the log-out operation is input. If the log-out operation is possible at this time, the agent's ID number is cleared from ID number registering table 31 and also the logical number of the terminating call dedicated line from terminating call dedicated line registering table 41. Thus, the diverted terminating call dedicated line is returned to the original extension line of extension telephone set 1-p.

Figure 10:
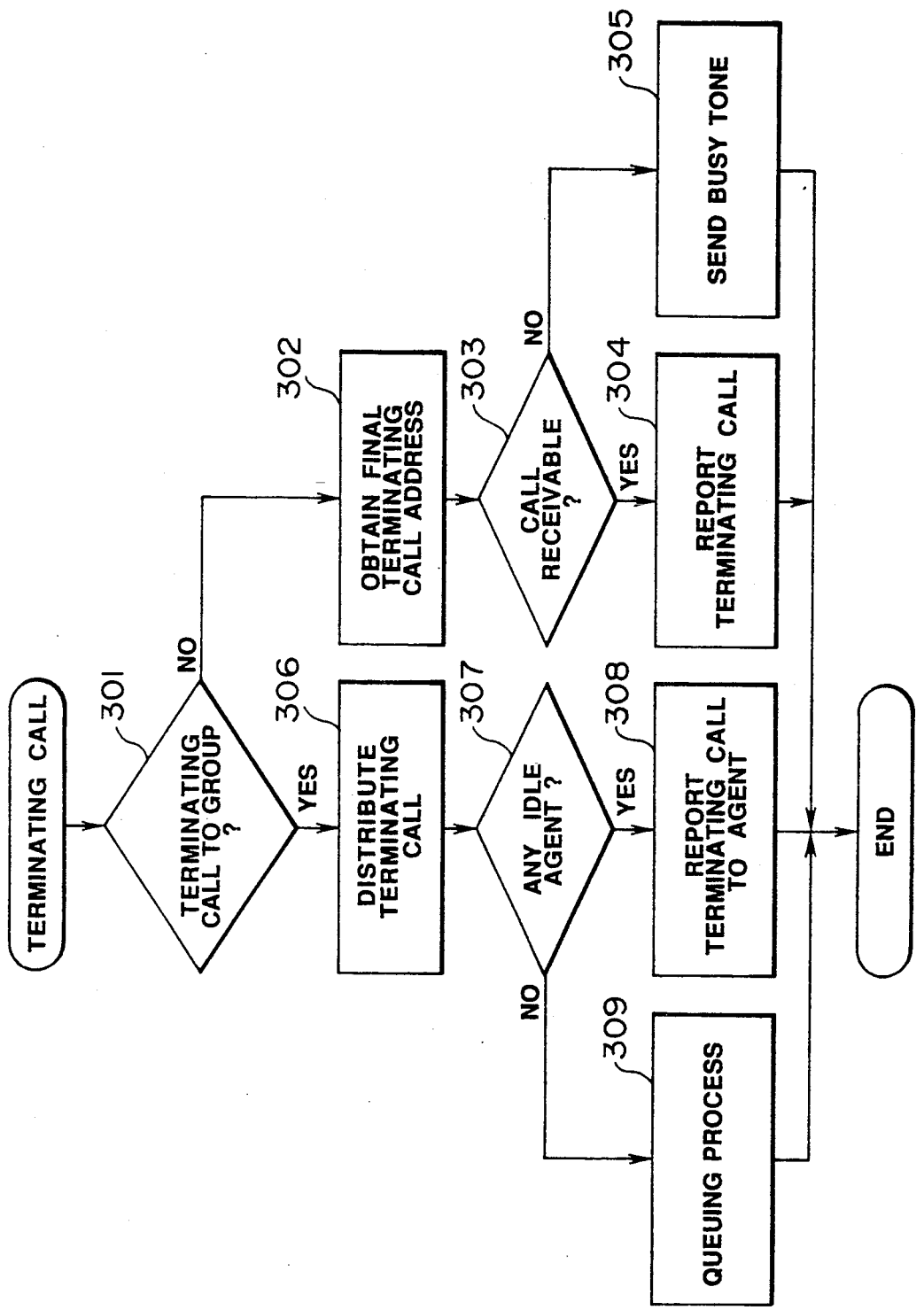
FIG. 10 is a flowchart indicative of the processing of 9 terminating call in the embodiment of FIG. 1.

The processing of a terminating call will be described in accordance with the flowchart of FIG. 10. First, if there is a terminating call, central control unit 6 determines whether the terminating call is for an extension telephone set group (step 301). Each extension telephone set group is allocated at least one central office line trunk circuit, which receives a terminating call for that group, so that central control unit 6 can determine whether the terminating call is for the extension telephone set group on the basis of the central office line trunk circuit which has received the terminating call, and identifies which extension telephone group that terminating call is for.

If the terminating call is not for that extension telephone set group, central control unit 6 identifies an extension telephone set which should receive that terminating call (step 302). At this time, central control unit 6 retrieves terminating call dedicated line registering table 41 and determines whether a logical number is registered in correspondence to the extension line of the identified extension telephone set. If not, the extension telephone set does not belong to that extension telephone set group, so that central control unit 6 determines that the terminating call is for that extension telephone set. If a logical number is registered in correspondence to that extension line of the identified extension telephone set, the extension telephone set belongs to that extension telephone set group, so that central control unit 6 retrieves transfer address registering table 71, reads another extension telephone number of the transfer address corresponding to the extension line of the extension telephone set, and determines that extension telephone set having that extension telephone number as a destination to which the terminating call is to be delivered in order to inhibit delivery of a terminating call to only a specified extension telephone set of the extension telephone set group.

Central control unit 6 then determines whether the extension telephone set to which the terminating call is to be delivered can respond to that terminating call (step 303). If so, central control unit 6 reports this terminating call to that extension telephone set through the corresponding extension circuit (step 304). Thus, the extension telephone set generates a ringing tone. If the extension telephone set is operated in response, central control unit 6 connects the extension circuit connected to that extension telephone set and the central office line trunk circuit which has received that terminating call through switching circuit 3 to thereby enable telephonic communication between that extension telephone set and the office line. If central control unit 6 determines that the extension telephone set cannot respond to the terminating call or if the extension number of the extension telephone at the transfer address is not registered on transfer address registering table 71, central control unit 6 sends a busy tone from tone circuit 9 via switching circuit 3 to the central office line trunk circuit (step 305). The busy tone is sent from the central office line trunk circuit to the office line, so that the fact that the terminating end is busy is reported to the originating end.

Therefore, if the terminating call is not for the extension telephone set group, the central control unit determines whether the extension telephone set which should receive the terminating call belongs to that extension telephone set group. If not, the central the central control unit reports the terminating call to that extension telephone set. If the extension telephone set belongs to the extension telephone set group, the number of the extension telephone set of the transfer address corresponding to the extension line of the extension telephone set is read from transfer address registering table 71, and the terminating call is transferred to another extension telephone set indicated by that extension telephone number.

If the central control unit determines that the terminating call is for one extension terminal group at step 301, it retrieves extension telephone set group vs. ID number registering table 51 to obtain the respective agents' ID numbers belonging to that extension telephone set group. The central control unit checks the agents' ID numbers with the respective ID numbers registered on ID number registering table 31, and selects at least one coincident ID number. The selected ID number is for the agent belonging to that extension telephone set group and processing terminating calls in the log-in to the terminating call dedicated line. Central control unit 6 obtains from ID number registering table 31 the respective terminating call dedicated lines corresponding to the selected ID numbers and selects the respective extension lines corresponding to the logical number of the terminating call dedicated line by retrieving terminating call dedicated line registering table 41.

When central control unit 6 selects the respective agents' ID numbers belonging to the extension telephone set group and processing the terminating calls, it obtains the priorities of these ID numbers in accordance with a predetermined terminating call distributing algorithm (step 306). The algorithm includes a process for arranging the respective agents' ID numbers in such a manner that an agent's ID number remaining for a longer time after the last terminating call has been processed has a higher priority. Central control unit 6 then determines whether the extension line on which the agent having the highest priority ID number has performed the log-in operation is idle. If not, it determines whether the extension line on which the agent having the second priority ID number has performed the log-in operation is idle. By repeating such determination, central control unit 6 selects an agent having a higher priority ID number and having an idle extension line on which the agent has performed the log-in operation (step 307). As a result, the selected agent has an idle extension line on which the agent has performed the log-in operation and has remained for the longest time since the last terminating call was processed. When one agent is thus selected, central control unit 6 reports the terminating call to the extension telephone set of the extension line on which the agent has performed the log-in operation (step 308). Thus, the extension telephone set generates a ringing tone. When the agent responds, work is done. At this time, central control unit 6 obtains the start and end times of a telephonic communication through the extension telephone set and reports to application processor 11 those times together with the agent's ID number, the terminating call dedicated line logical number and the pilot number of the extension telephone set group. Application processor 11 compiles and stores on a time basis data on each of the ID numbers, logical numbers and pilot numbers.

Unless there is an agent whose extension line subjected to the log-in operation at step 307 is idle, the control unit determines that there is no agent which can directly handle the terminating call, and puts the terminating call in the quene of terminating calls in the extension telephone set group, so that the terminating call is required wait until an agent which can respond to such terminating call appears (step 309).

Therefore, if an agent's ID number belonging to an extension telephone set group for which there occurs a terminating call is registered on ID number registering table 31, the control unit retrieves table 31 to obtain the logical number of a terminating call dedicated line on which the agent has performed a log-in operation. Furthermore, the central control unit retrieves terminating call dedicated line registering table 41 to obtain an extension line which is diverted to the terminating call dedicated line, and reports the terminating call to the extension line diverted to the terminating call dedicated line.

Figure 11:
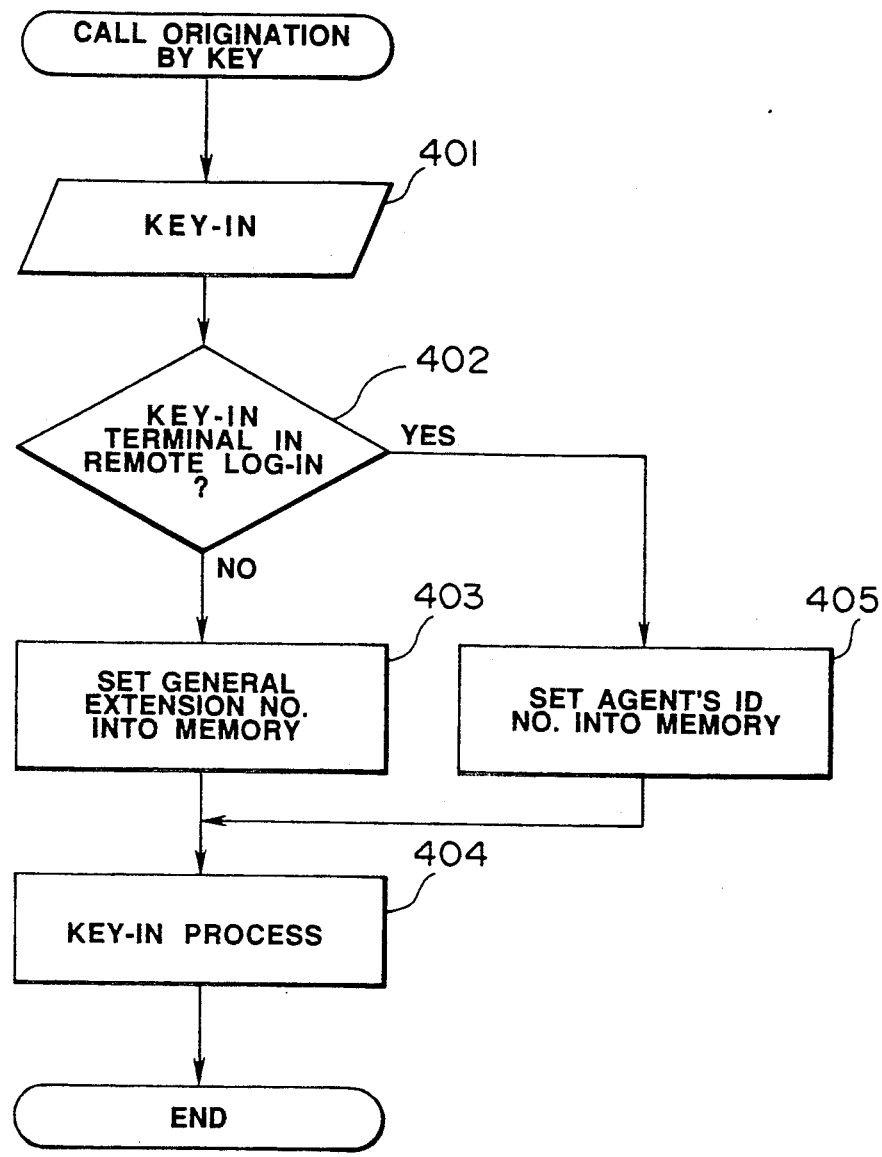
FIG. 11 is a flowchart indicative of call origination in the embodiment of FIG. 1.

Call origination will be described with reference to a flowchart of FIG. 11. First, if an extension telephone set originates a call (step 401), central control unit 6 determines that there is a request for call origination from the extension telephone set. In response to the request, central control unit 6 retrieves terminating call dedicated line registering table 41 and determines whether the logical number of an terminating call dedicated line is registered at a location corresponding to the extension line of the extension telephone set. If so, the extension line is diverted to a terminating call dedicated line. If not, the extension line is not diverted to the terminating call dedicated line (step 402) in which case ordinary call origination is performed. Namely, the extension number indicative of the extension line is stored at a working location in main memory 8 (step 403), the subsequent call origination from the extension telephone set is performed as an extension line on the basis of the extension telephone number at the working location (step 404). If the extension line is diverted to the terminating call dedicated line at step 402, a logical number indicative of the terminating call dedicated line is stored at a working location in main memory 8 (step 405), the subsequent processing of call origination from the extension telephone set is performed as a terminating call dedicated line on the basis of the logical number of the terminating call dedicated line stored at the working location (step 404). For example, call origination is inhibited.

As described above, according to the present embodiment, it is easy to divert the extension line of an extension telephone set to a terminating call dedicated line or to return the diverted terminating call dedicated line to the original extension line by operating the extension telephone set. Therefore, even if there occurs a large amount of terminating calls for one extension telephone set group, it can be rapidly handled by diverting a desired extension line to a terminating call dedicated line.

What is claimed is:

1. A telephone system comprising:
a plurality of extension terminals;
switching means, connected to the plurality of extension terminals and to a plurality of office lines, for connecting an extension terminal with one of the office lines in response to call origination from the extension terminal and for connecting an office line with one of the extension terminals in response to a terminating call from the office line;
input means, provided for each of the extension terminals, for inputting data for converting the extension terminal for which the input means is provided into a terminating call dedicated terminal;
terminating call dedicated registering means, included in said switching means, for registering an extension terminal through which data for converting the extension terminal into a terminating call dedicated terminal is input; and
automatic terminating call distributing means for controlling the switching means so as to distribute a terminating call directed to an extension terminal group consisting of extension terminals which are converted into terminating call dedicated terminals, to one of the extension terminals registered in the terminating call dedicated registered means.

2. A telephone system comprising;
switching means, connected to a plurality of extension terminals and to a plurality of office lines, for connecting an extension terminal with one of the office lines in response to call origination from the extension terminal and for connecting an office line with one of the extension terminals in response to a terminating call from the office line;
input means, provided for each of the extension terminals, for inputting, through the extension terminals, data for converting the extension terminals into terminating call dedicated terminals;
terminating call dedicated registering means for registering an extension terminal through which data for converting the extension terminal into a terminating call dedicated terminal is input;
automatic terminating call distributing means for controlling the switching means so as to distribute terminating calls directed to an extension terminal group consisting of extension terminals which are converted into terminating call dedicated terminals, to the extension terminals on the basis of the registered content of the terminating call dedicated registering means; and
means for registering a transfer address,
wherein when an extension terminal is registered in the terminating call dedicated registering means, a transfer address of the extension terminal is stored in the transfer address registering means, and when there is a terminating call for the extension terminal and not for an extension terminal group including the extension terminal, the terminating call is transferred to a transfer address of the extension terminal registered in the transfer address registering means.

3. A telephone system according to claim 1, further comprising means for registering an identification number of an operator using an extension terminal converted into a terminating call dedicated terminal,
wherein when the extension terminal is registered in the terminating call dedicated registering means, the identification number of the operator using the extension terminal is registered in the identification number registering means.

4. A telephone system comprising:
a switching circuit, connected to a plurality of office lines and extension lines leading from a corresponding plurality of extension telephone sets, for selectively connecting the respective extension lines with the respective office lines;
control means for connecting an extension line from an extension telephone set with one of the office lines through the switching circuit in response to a call origination from the extension telephone set, and for connecting an office line with one of the extension lines in response to a terminating call from the office line; and
a terminating call dedicated table for registering logical numbers of terminating call dedicated lines in correspondence to the extension lines from the extension telephone sets,
wherein when data for converting an extension line from an extension telephone set into a terminating call dedicated line, is inputted by pressing a key provided at the extension telephone set in a predetermined process, the control means registers in the terminating call dedicated table, the logical number of the terminating call dedicated line in correspondence to an extension line from the extension telephone set; and
wherein when there is a terminating call for an extension telephone set group consisting of extension terminals having corresponding lines converted into terminating call dedicated lines, the control means distributes the terminating calls to the respective extension telephone sets on the basis of the registered contents of the terminating call dedicated table.

5. A telephone system according to claim 4, further comprising a transfer address table for registering therein a transfer address of the extension telephone sets,
wherein when a logical number of a terminating call dedicated line is registered in the terminating call dedicated table in correspondence to an extension line from an extension telephone set, the control means registers a transfer address of the extension telephone set in the transfer address table, and
wherein when there is a terminating call for an extension telephone set and not for an extension telephone set group including the extension telephone set, the control means transfers the terminating call to transfer address of the extension telephone set registered on the transfer address table.

6. A telephone system according to claim 4, further comprising an identification number table for registering an identification number of an operator using an extension telephone set having a line converted into a terminating call dedicated line,
wherein when the identification number of the operator is inputted by pressing a key of an extension telephone set in the registration of the logical numbers of the terminating call dedicated lines on the terminating call dedicated table in correspondence to the extension lines from the extension telephone sets, the control means registers the identification numbers in the identification number table.

7. A method of performing communication within a telephone system provided with a plurality of extension terminals and switching means connected to the extension terminals and to a plurality of office lines, comprising the steps of:
inputting, through each extension terminal, data for converting the extension terminal through which the data is input, into a terminating call dedicated terminal;
registering, in the switching means, each extension terminal through which data for converting the extension terminal into a terminating call dedicated terminal is input;
distributing a terminating call issued from one of the office lines and directed to an extension terminal group consisting of extension terminals which are converted into terminating call dedicated terminals, to one of the extension terminals registered in the registering step; and
connecting the office line with the extension terminal to which the terminating call is distributed in the distributing step, in response to the terminating call issued from the office line and directed to the extension terminal group.

* * * * *